INVENTOR
NORMAN J. RITZERT.
BY
ATTORNEYS

May 12, 1936.  N. J. RITZERT  2,040,105
PROCESS AND APPARATUS FOR LATEXING CORDS
Filed Feb. 13, 1934  8 Sheets-Sheet 6

INVENTOR
NORMAN J. RITZERT.
BY
ATTORNEYS

May 12, 1936.  N. J. RITZERT  2,040,105

PROCESS AND APPARATUS FOR LATEXING CORDS

Filed Feb. 13, 1934  8 Sheets-Sheet 7

INVENTOR
NORMAN J. RITZERT.
BY
ATTORNEYS

May 12, 1936.　　　　N. J. RITZERT　　　　2,040,105

PROCESS AND APPARATUS FOR LATEXING CORDS

Filed Feb. 13, 1934　　　8 Sheets-Sheet 8

INVENTOR
NORMAN J. RITZERT.
BY
ATTORNEYS

Patented May 12, 1936

2,040,105

UNITED STATES PATENT OFFICE 2,040,105

PROCESS AND APPARATUS FOR LATEXING CORDS

Norman J. Ritzert, Dayton, Ohio, assignor to The Dayton Rubber Mfg. Company, Dayton, Ohio, a corporation of Ohio Application February 13, 1934, Serial No. 711,033

7 Claims. (Cl. 91—68)

This invention relates to methods of and apparatus for impregnating and coating cords with latex.

The problems encountered in making this invention were to find a process and means of thoroughly and completely impregnating and coating heavy cords with latex, such cords being used for the neutral axis portions of rubber belts; also to keep the latex from getting into the working parts of the apparatus; also to maintain the pulling of the cord under an even tension yet with the slightest convenient tension while it is passing through the latex; and also to shut off the machine automatically in the event of a snarl or a tangle.

One object of my invention is to provide a method of completely impregnating a cord with latex throughout its interior fibers, as well as to regulate the tension of the cord while impregnating it, and also to coat the cord after such impregnation.

Another object is to provide apparatus for impregnating and/or coating the cord with latex, whereby the interior fibers of the cord will be completely impregnated, the apparatus being provided with means for flexing and/or squeezing the cord to facilitate this impregnation.

Another object is to provide such an apparatus with its parts so arranged that the latex will be prevented from getting into the working parts thereof and interfering with the operation.

Another object is to provide apparatus for winding up the impregnated and coated cord on to suitable holders, and for regulating the tension of the cord while being so wound; also for winding the cord in level layers on the holder; and also for disconnecting the power from the machine in the event of the cord becoming tangled or failing to wind.

Another object is to provide apparatus for regulating the level of the latex relative to the cord.

Another object is to provide means whereby the cord will be passed through the solution under as slight a tension as is convenient in order to enhance the opening up of the internal fibers and strands to facilitate the impregnation thereof.

The apparatus briefly described (Figures 1 and 2) consists of a latex tank through which the cords are fed in circuitous paths under very slight tension, the cords being thereby flexed and their internal fibers thus opened up for more convenient impregnation; additional devices for squeezing the cord, while in the latex tank, may be optionally provided to enhance the impregnating action. Beyond the latex tank the cords pass under latex drying spouts over guide pulleys and around floating-arm pulleys connected with devices for controlling the tension thereof. Beyond the floating-arm pulleys, the cords pass through a level winding device on to power-driven spools whose driving mechanism is equipped with brakes regulated by the float-arm pulley mechanism. The impregnating apparatus is provided with means for raising and lowering the latex tank in order to control the level of the latex relative to the positions of the cords.

*Latex-impregnating section of the apparatus*

Figure 1:
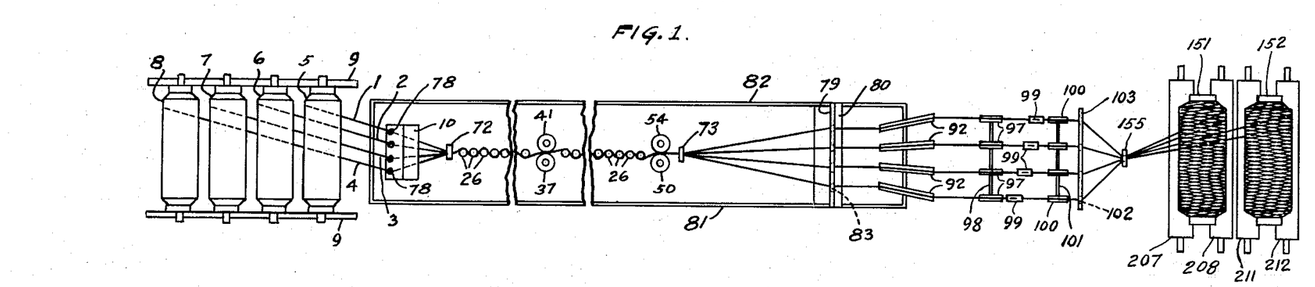
Figure 1 is a diagrammatic plan view, partly in section, of the apparatus of my invention, showing the main elements involved in its operation.
Figure 2:
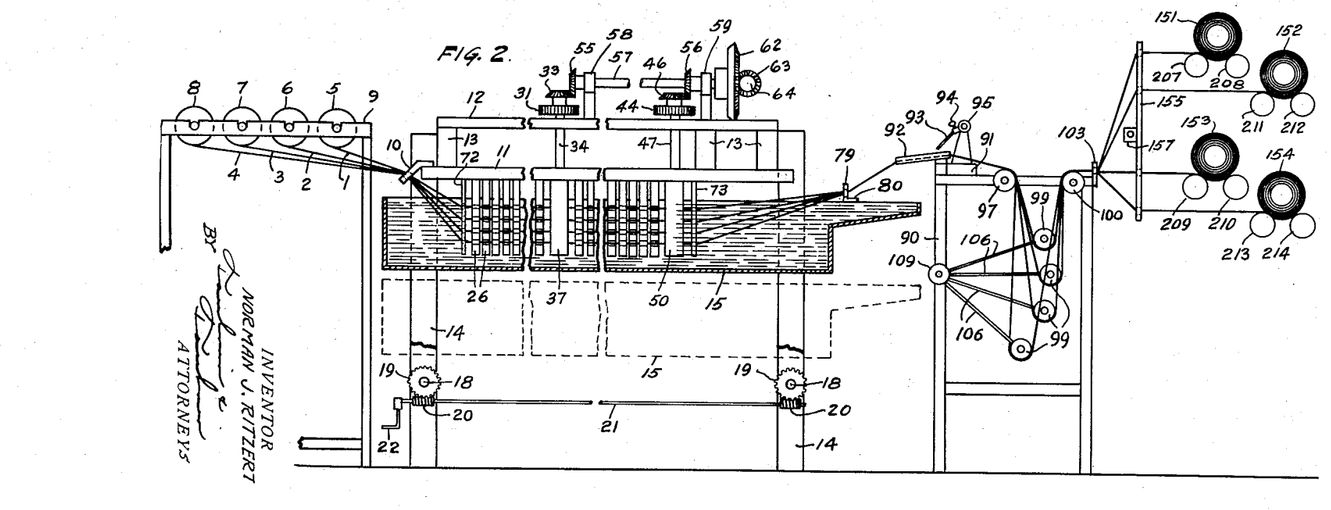
Figure 2 is a diagrammatic side elevation, partly in section, of the apparatus shown in Figure 1.

Referring to the drawings in detail, Figures 1 and 2 show the latex-impregnating section of the apparatus in relation to the other sections thereof, as previously described above. The unimpregnated cords 1, 2, 3 and 4 are distributed from spools 5, 6, 7 and 8 mounted upon a spool rack 9 provided for that purpose. Four spools and four cords are being shown for purposes of illustration only, it being understood that a greater or lesser number of cords may be used in the apparatus.

The progress of the cord 1 will be traced through the apparatus, the courses of the other cords being substantially similar.

Figures 3, 4:
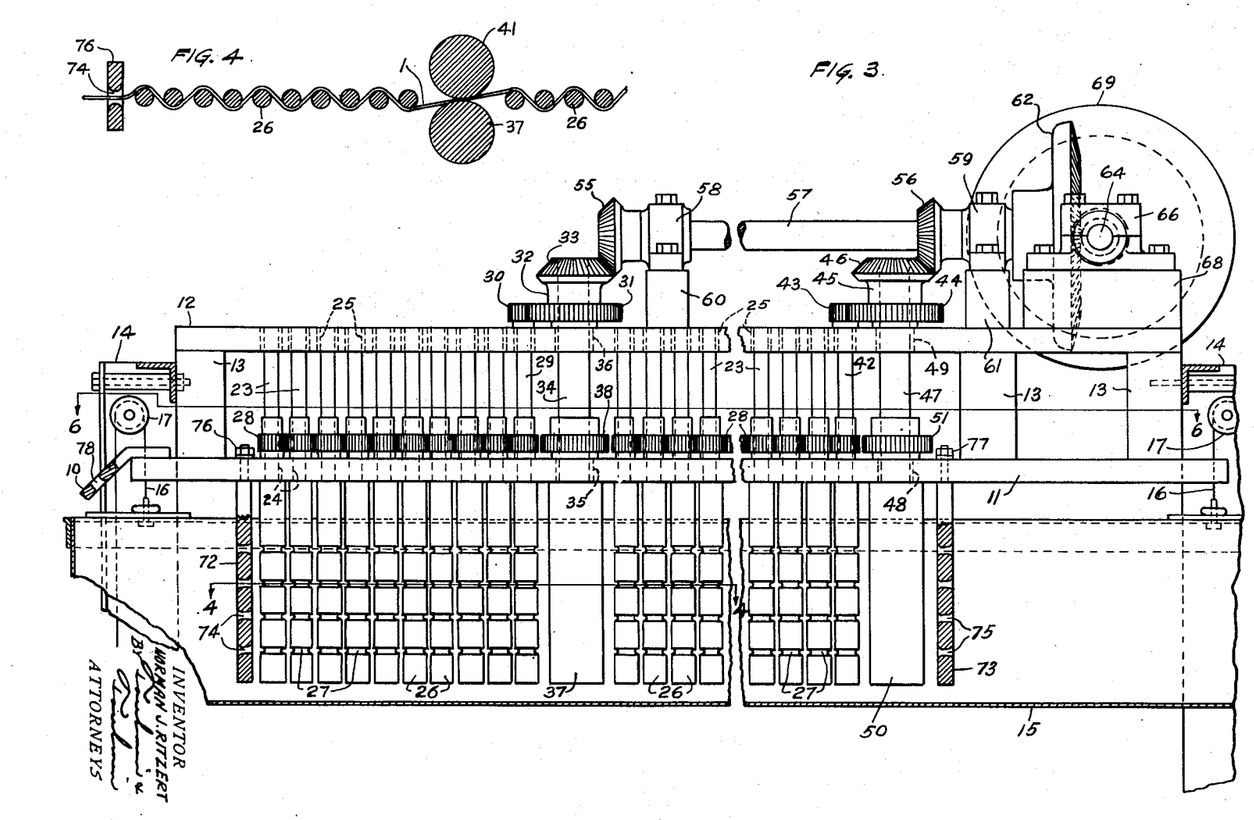
Figure 3 is a side elevation, partly in section, of the latex impregnating section of the apparatus.
Figure 4 is a section along the line 4—4 of Figure 3.

Beyond the spools, the cords pass through the distributor plate 10 mounted on the base 11 of the latex-impregnating section of the apparatus (Figures 1 and 2). The base 11 carries an upper platform 12 (Figure 3) supported by the posts 13. The base 11 is supported on a main frame 14. The latter also supports the latex tank 15, which is suspended by cables 16 passing over the guide pulleys 17 on to windlass rods 18 (Figures 2 and 3). The ends of the windlass rods 18 carry worm gears 19 which mesh with worms 20 mounted on the crank shaft 21, one end of which is provided with the hand crank 22. Thus by turning the hand crank 22, the cable windlass shafts 18 are caused to revolve, winding up or unwinding the cables 16, and raising or lowering the latex tank 15 suspended thereby. In this manner the level of the latex fluid in the tank may be adjusted relative to the apparatus above it.

Figures 5, 6:
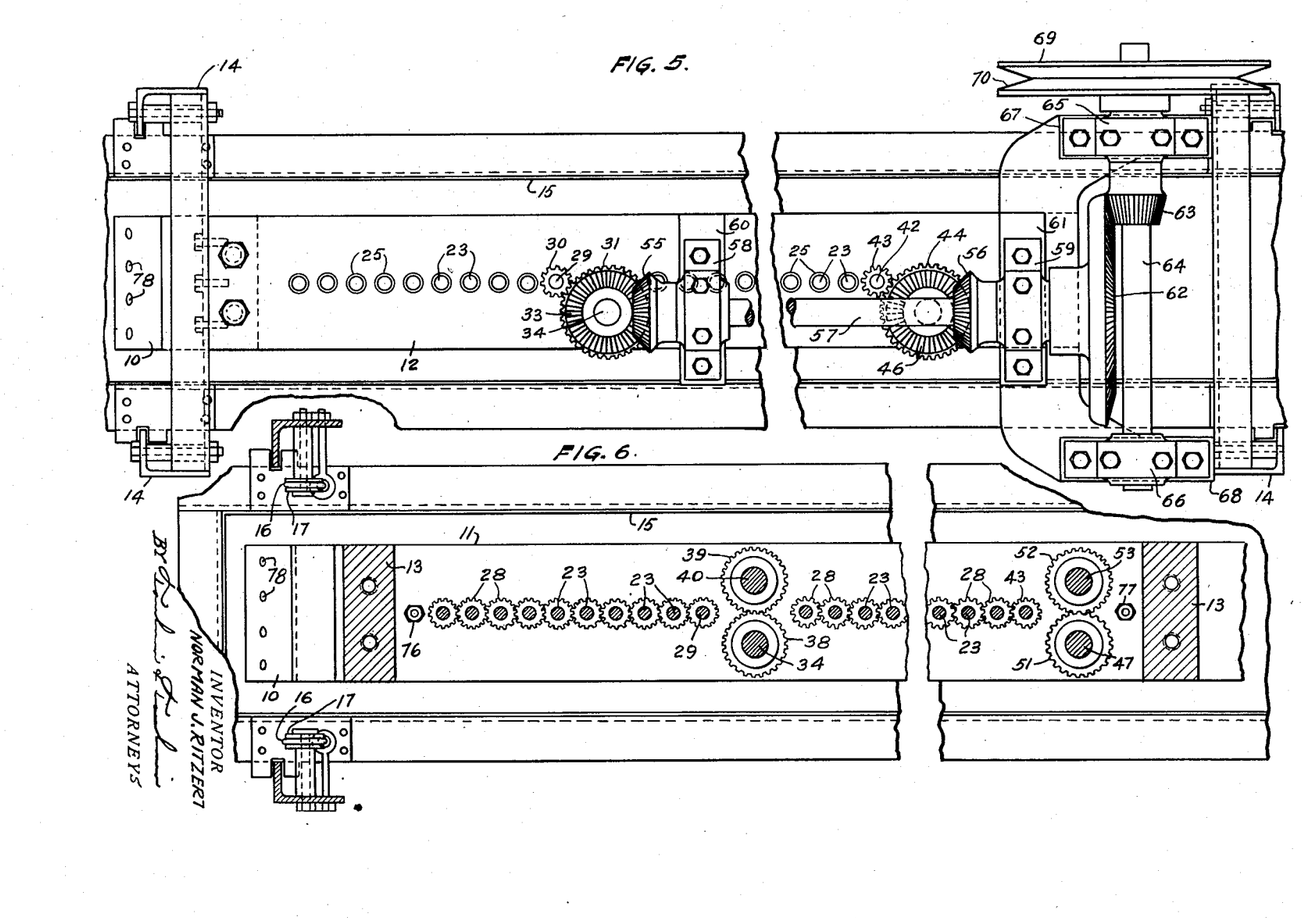
Figure 5 is a top plan view of the apparatus shown in Figure 3.
Figure 6 is a horizontal sectional view along the line 6—6 of Figure 3.

Supported partly by the base 11 and partly by the platform 12 is a plurality of spindle shafts 23 having bearings 24 in the base 11 and bearings 25 in the upper platform 12. Each one of the spindles 23 is provided at its lower end with a roller 26 having grooves 27 in the periphery thereof, these grooves being adapted to guide and space the various cords in their passage therethrough. Each spindle 23 is additionally provided with a pinion 28 by which it is driven (Figure 3). The pinions 28 intermesh successively with one another (Figure 6), one of them being provided with a master spindle 29 (Figure 3), having a pinion 30 mounted on its uppermost end above the platform 12. Meshing with this pinion 30 is a gear 31 on a collar 32, the upper portion of which is provided with a bevel gear 33. The collar 32 is secured to a shaft 34 having bearings 35 and 36 in the main base 11 and the platform 12 respectively. The lower end of the shaft 34 is provided with a squeeze roller 37, and to its mid-portion is secured a gear 38. The gear 38 meshes with a similar gear 39 (Figure 6). The latter is mounted on a vertical spindle 40 in a manner similar to that of the spindle 34, and is provided on its lower end with a squeeze roller 41 similar to the squeeze roller 37 (Figures 1 and 4). The squeeze rollers 37 and 41 are separated from one another by a space somewhat less than the diameter of the cord 1, so that the latter is compressed as it passes between them.

Beyond the squeeze rollers 37 and 41, the apparatus is provided with a plurality of spindles and grooved rollers similar to those already described, and hence designated by the same numerals. These other sets of rollers are driven by similar gearing to the first set, through similar intermeshing pinions 28, master spindle 42, master pinion 43, gear 44 meshing therewith, and mounted on the collar 45 having the bevel pinion 46 attached thereto. The collar 45 is secured to the vertical shaft 47 (Figure 3) having bearings 48 and 49 in the main base 11 and the platform 12 respectively. The shaft 47 is provided with a squeeze roller 50 and also with a gear 51 meshing with a similar gear 52. The latter is secured to a vertical shaft 53 mounted in a similar manner to shaft 40, and carrying on its lower end the squeeze roller 54 (Figures 1 and 6). The squeeze rollers 50 and 54 are similar in construction and operation to the squeeze rollers 37 and 41, of which they are substantially duplicates. Each cord is progressively and alternately flexed in opposite directions as it passes through the latex and thereafter compressed while in the latex.

Figures 9, 10:
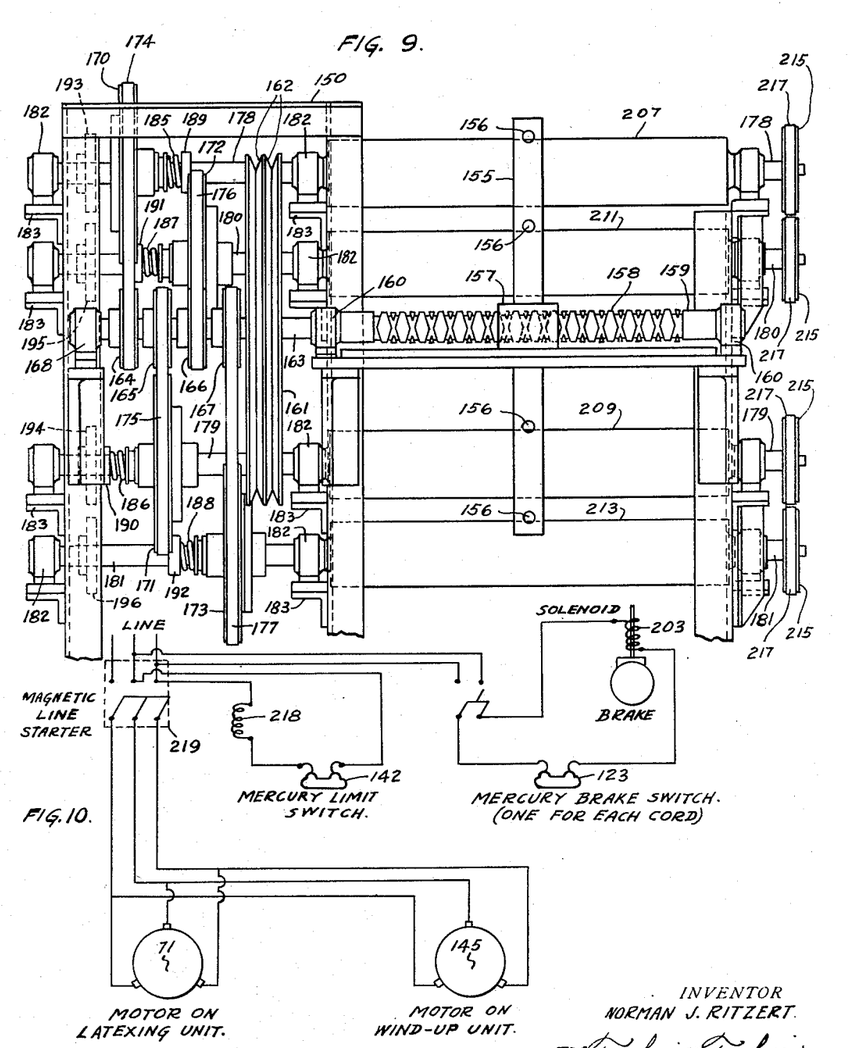
Figure 9 is a front elevational view of the winding section of the apparatus, showing the tension brakes and level-winding devices.
Figure 10 is an electrical wiring diagram showing the electrical control circuit of the apparatus.

The bevel pinions 33 and 46 mesh respectively with bevel pinions 55 and 56 respectively, these being secured to the horizontal shaft 57 having bearing support in the pillow blocks 58 and 59 respectively (Figure 3). The pillow blocks 58 and 59 are mounted upon brackets 60 and 61 respectively, these being mounted upon the platform 12. Beyond the pillow block 59, a bevel gear 62 is secured to the end of the horizontal shaft 57 (Figures 3 and 5). The bevel gear 62 meshes with a bevel pinion 63 fixed to the cross shaft 64 supported in the pillow blocks 65 and 66 respectively. The latter are supported on brackets 67 and 68 which in turn are supported by the platform 12. The outer end of the cross shaft 64 carries the drive pulley 69. The latter is provided with a groove 70 which is belted through suitable gearing to a source of power, such as an electrical motor 71 (Figure 10).

Likewise attached to the platform 11 and extending downward into the tank on each end of the two rows of rollers 26 are cord guide plates 72 and 73 respectively (Figure 3). These cord guide plates are provided with apertures 74 and 75 adapted to receive the cord and direct it onward into the groove 27, the apertures 74 and 75 being aligned with the grooves 27 for this purpose. The cord guide plates 72 and 73 are secured to the platform 11 by the bolts 76 and 77 respectively. Similarly, the aperture plate 10 is provided with apertures 78 arranged so as to guide the cords 1, 2, 3 and 4 and direct them downwardly into the apertures 74 of the cord guide plate 72.

A second aperture plate 79 is mounted on a bracket 80 extending between the sidewalls 81 and 82 of the latex tank 15. The aperture plate 79 is provided with apertures 83 so spaced and arranged as to provide guidance for the cords as they leave the latex solution. (Figures 1 and 2).

Latex-drying and tension-controlling section of the apparatus

Figure 7:
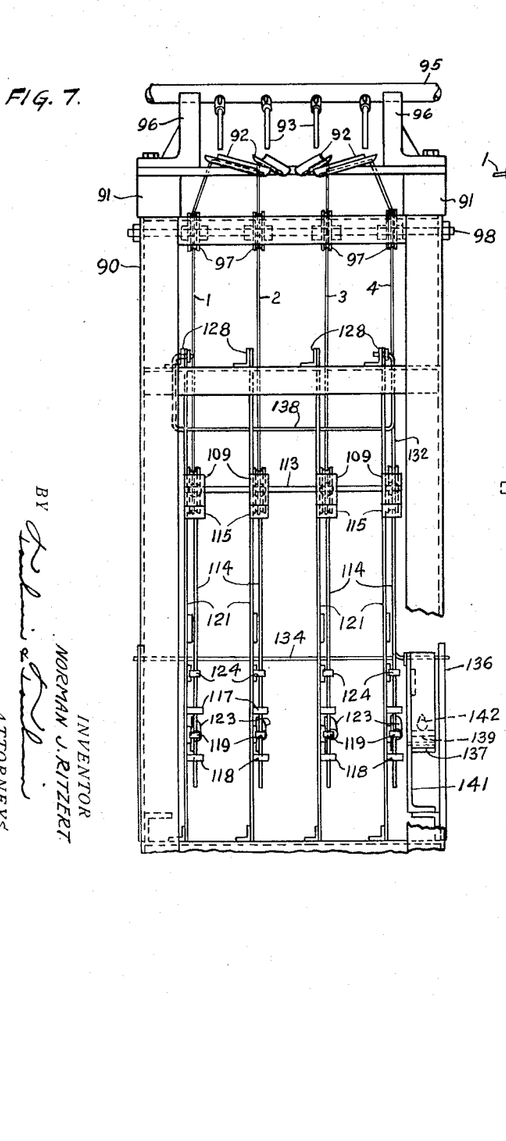
Figure 7 is a front elevational view of the tension controlling and drying section of the apparatus.
Figure 8:
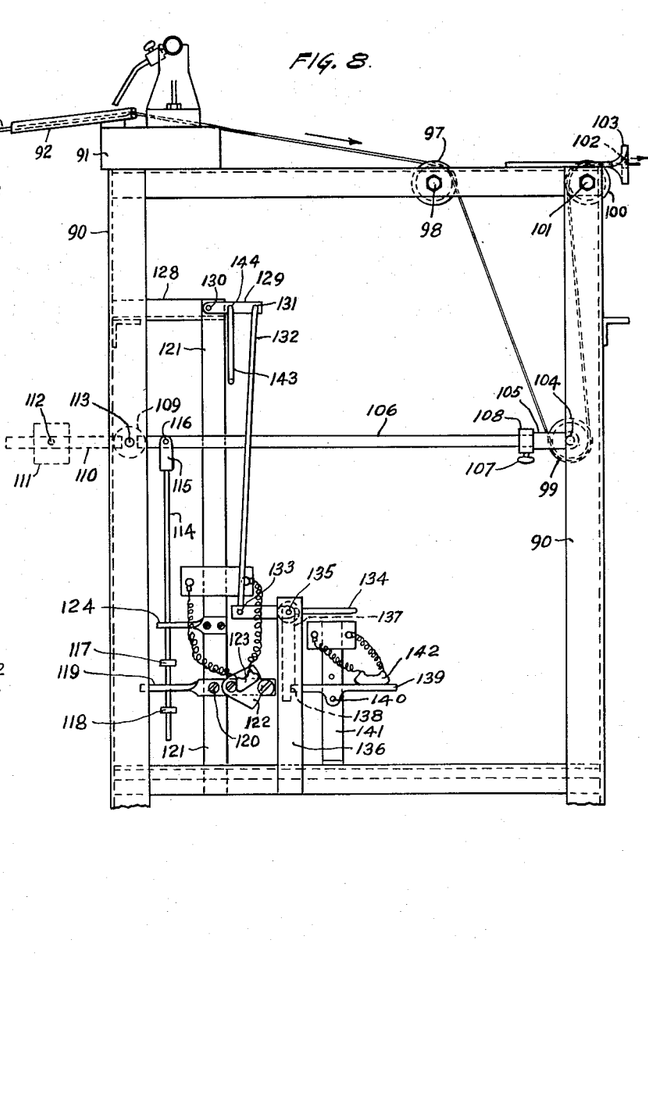
Figure 8 is a side elevational view of the tension controlling section of the apparatus shown in Figure 7.

The above-entitled section of the apparatus is shown in its relationship to the remainder of the apparatus in Figures 1 and 2, and in enlarged detail in Figures 7 and 8. This section of the apparatus is supported by a frame 90.

The latex-drying portion is secured to a cross bracket 91 mounted on the upper part of the frame 90. The cross bracket 91 supports the cord troughs 92 (Figures 1 and 8), through which the cords 1, 2, 3 and 4 pass after leaving the apertures 83 in the aperture plate 79. Above each cord trough 92 is arranged an air pipe 93, controlled by the valve 94, and leading to the air conduit 95 supported on the bracket 96 which in turn is mounted upon the cross bracket 91. The valves 94 are adjusted so that a steady flow of air is directed upon the cords, as they pass along through the cord troughs 92 (Figures 1, 7 and 8).

The tension-controlling apparatus is likewise arranged on the frame 90. Beyond the cord troughs 92, the cords pass over guide pulleys 97 mounted on the guide pulley shaft 98. A plurality of these guide pulleys is provided, one guide pulley for each cord being impregnated. Beyond the guide pulleys 97, each cord passes downward and around a floating pulley 99 to a second guide pulley 100 mounted on a second guide pulley shaft 101, passing through the top portion of the frame 90 (Figures 1, 7 and 8). Beyond the guide pulleys 100, each cord passes through apertures 102 in a third aperture plate 103 likewise mounted on top of the frame 90.

The floating pulleys 99 are supported on axles 104 which in turn are carried by yokes 105 adjustably attached to the floating arms 106, as by the set screws 107 engaging the socket 108 surrounding the end of the floating shaft 106. The latter is mounted in an axle disk 109 through which passes the spindle 113 (Figures 7 and 8). Beyond the disk 109 a continuation shaft 110 may be supplied, and provided with a movable counter-weight 111 with a set screw 112 engaging the shaft 110. By sliding the counter-weight 111 along the shaft 110, it is obvious that the amount of force required to lift the floating pulley 99 will be varied. For each cord being impregnated, there is provided a separate floating pulley 99 and the devices associated with it, as described above.

Between the spindle 113 and the floating pulley 99, a connecting rod 114 is attached, as by the yoke 115 pivotally engaging it by means of the pivot pin 116 (Figure 8). Each connecting rod 114 near its opposite end carries an upper collar 117 and a lower collar 118. Between these collars the rod 114 passes through the switch lever 119. Each connecting rod 114 is guided in its reciprocation by the guide arm 124 fixedly attached to the frame member 121. The switch arm 119 is pivotally mounted on the screw 120 secured to the frame member 121 which in turn is attached to the frame 90. The opposite end of the lever 119 is provided with a bracket 122 which carries the mercury switch 123. The latter is connected by suitable wiring to the remainder of the electrical circuit.

Pivotally secured to the upper end of the frame arm 121, which is spaced from the main frame 90 by the horizontal arm 128, is a lever 129. One end of the lever finds bearing support on the pivot pin 130, whereas the opposite end is pivotally connected, as at 131, to the connecting rod 132. The lower end of the latter is pivotally connected, as at 133, to the lever 134 which in turn is pivotally supported, as at 135, on the upwardly extending frame arm 136. The lever 134 is provided with a latch arm 137 which has a cut-away portion 138 engaging one end of the switch arm 139. The latter is pivotally mounted, as at 140, to the vertical frame member 141 and carries the mercury switch 142. The latter is similar to the mercury switch 123, and is likewise connected by suitable wiring to the remainder of the electrical circuit hereinafter described in detail. The lever 129 is provided with a stop arm 143 which is pivotally attached thereto, as at 144, between the two ends 130 and 131 thereof.

It will be understood that the apparatus is provided with one assembly of the levers and switches 123 just described, for each cord being impregnated. The drawings (Figures 7 and 8) show four such assemblies, for controlling the tension of the four cords illustrated as an example. When the floating arm 106 moves upward or downward until it encounters the stop arms 143 or 134, it will shift these, disengaging the latch member 137 from the end of the switch arm 139. This causes the mercury switch 142 to be released, breaking the connection in the circuit to which it is attached. These stop arms 143 and 134 thus constitute limit stops for the floating arm 106. In between these limits, however, each mercury switch 123 controls the electrical apparatus as it is shifted up or down by the collars 117 or 118 on the connecting rod 114. The mercury switch 142 is connected to break the circuit in the latexing unit drive motor 71 and the wind-up motor 145, described later. each of the electrical switches 123 is connected to a solenoidal brake hereinafter described.

Wind-up section of the apparatus

Figure 11:
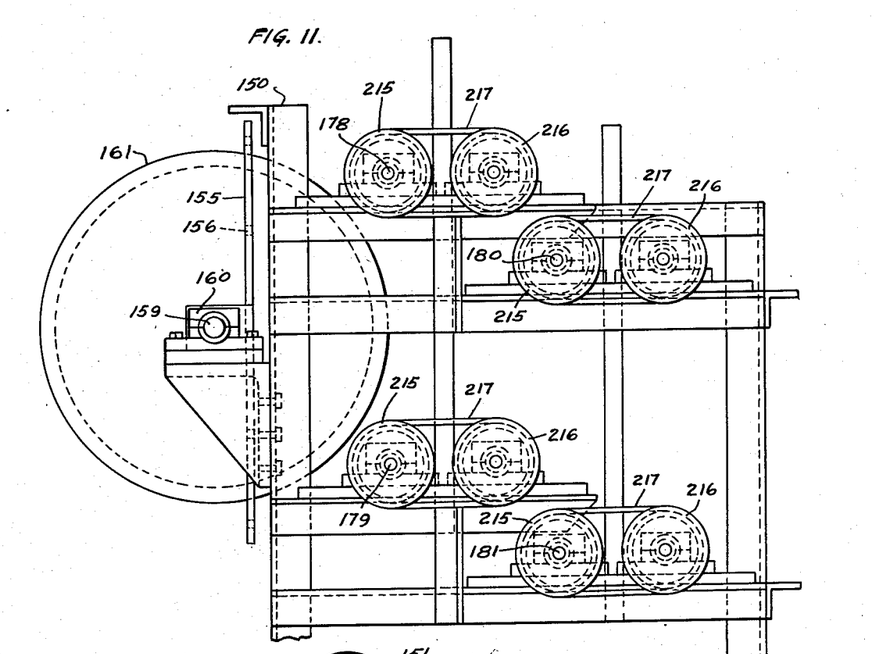
Figure 11 is a righthand side elevation of the apparatus shown in Figure 9.
Figure 12:
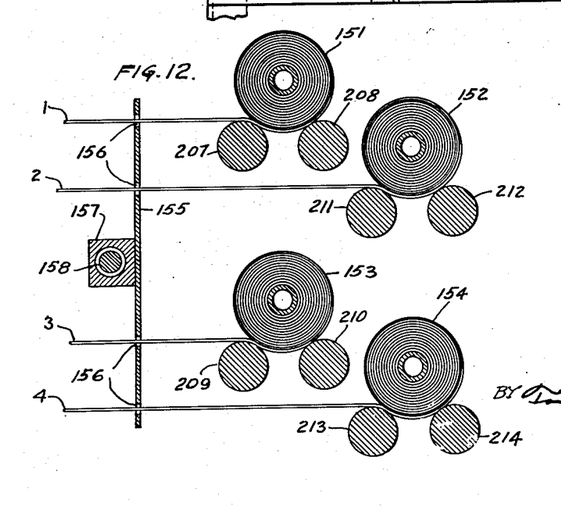
Figure 12 is a diagrammatic vertical section along the line 12—12 of Figure 9.

Beyond the tension-regulating section of the apparatus is located the wind-up apparatus (Figures 1, 2, 9, 11 and 13). The wind-up apparatus is mounted upon a frame 150, carrying spools 151, 152, 153 and 154 (Figure 12). These spools serve to receive the cord after it has been impregnated and coated with latex. Before being wound on the spools 151 to 154 inclusive, the cords pass through a guide arm 155 having guide apertures 156 therethrough. The guide arm 155 is secured to a nut 157 which engages interlocking spiral grooves 158 in a shaft 159. The latter is supported in bearings 160 attached to the frame 150 and continues as the main drive shaft 163, which in turn carries the main drive pulley 161 secured thereto. The main drive pulley 161 is grooved as at 162 to accommodate a V-belt whereby it is driven, through appropriate gearing, from the wind-up motor 145 (Figure 10). Consequently, when the pulley 162 is rotated, the nut 157 will move to and fro along the shaft 159, so that the apertures 156 guide the cords in such a manner that these are wound in even layers upon the spools 151 to 154.

Figure 13:
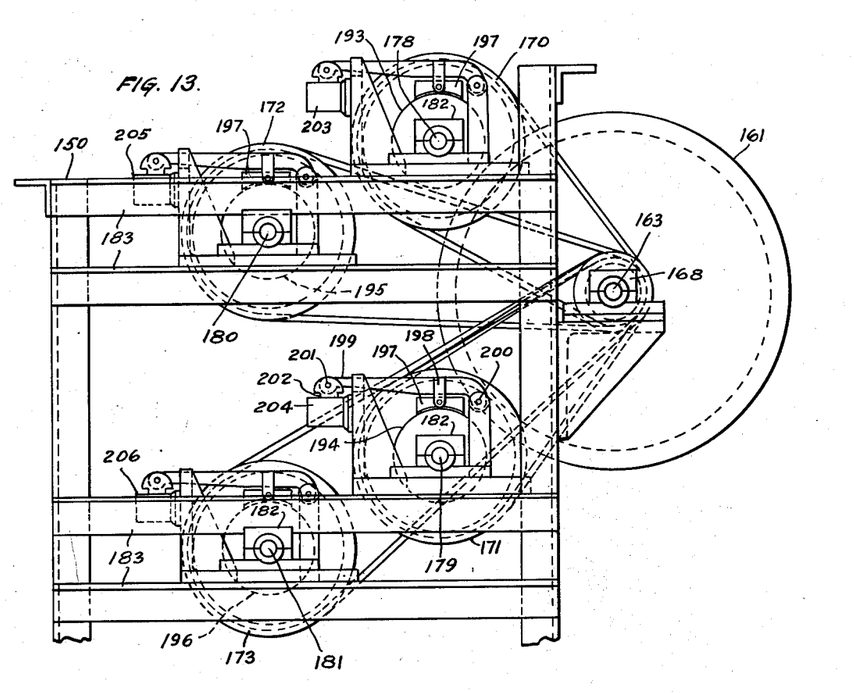
Figure 13 is a lefthand side elevation of the apparatus shown in Figure 9, showing the solenoidal brake mechanism for regulating the tension of the cords.
Figure 14:
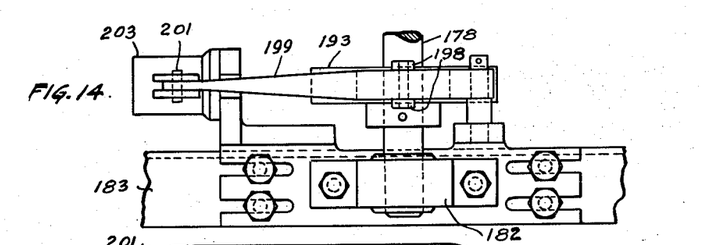
Figure 14 is an enlarged top plan view of one of the solenoidal brake assemblies shown in Figure 13.
Figure 15:
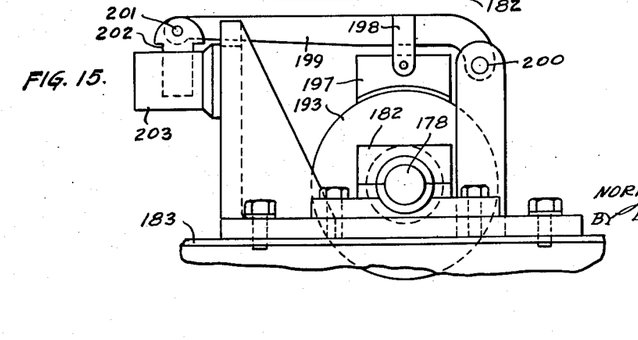
Figure 15 is an enlarged side elevation of the solenoidal brake assembly shown in Figure 14.
Figure 16:
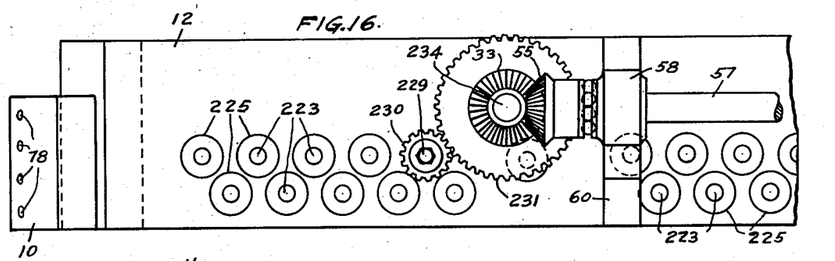
Figure 16 is a top plan view of a modified form of impregnating apparatus.
Figure 17:
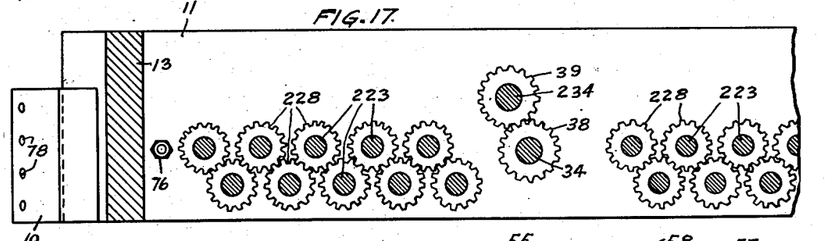
Figure 17 is a horizontal sectional view along the line 17—17 of Figure 19.

The main drive shaft 163 likewise carries the grooved pulleys 164, 165, 166 and 167, and is supported in the pillow block 168 at its outer end (Figures 9 and 13). The grooved pulleys 164, 165, 166 and 167 are drivingly connected to the pulleys 170, 171, 172 and 173 respectively by the V-belts 174, 175, 176 and 177 respectively. The pulleys 170 to 173 inclusive are loosely mounted on the shafts 178, 179, 180 and 181 respectively, supported in the bearing blocks or pillow blocks 182 mounted on the angle members 183 of the frame 150. The hub of each pulley 170, 171, 172 or 173 is yieldably associated with springs 185, 186, 187 and 188 to collars 189, 190, 191 and 192, which in turn are fixedly secured to their respective shafts, as by set screws (not shown).

Each of the shafts 178, 179, 180 and 181 carries a brake drum, these brake drums being respectively designated 193, 194, 195 and 196 (Figures 9 and 13). These brake drums are essentially alike, and each is engaged by a brake shoe 197 which is pivotally attached to the yoke 198 on the brake lever 199. The latter is pivoted at one end 200, and at the other end is pivotally joined at 201 to a plunger 202. Each of the plungers 202 is surrounded by a solenoid, these solenoids being respectively designated 203, 204, 205 and 206. When the solenoids 203 to 206 inclusive are energized, they draw their plungers 202 inward, causing their brake shoes 197 to come in contact with their brake drums 193 to 196 inclusive, retarding the shafts to which the brake drums are attached.

The machine is equipped with four pairs of rollers respectively designated 207 to 214 inclusive, arranged in pairs. The forward rolls 207, 209, 211 and 213 are arranged respectively on the shafts 178 to 181 inclusive, these shafts carrying pulleys 215 which drive pulleys 216 operatively connected with the rearward rolls 208, 210, 212 and 214, through the agency of the V-belts 217 (Figure 11). During the operation of the machine each of the cord spools 151 to 154 inclusive rests upon a pair of these rolls and is driven by them.

The mechanism is so arranged that the rolls 207 to 214 inclusive are driven at a slightly greater peripheral speed than the speed of the cord. Because of this difference in wind-up speed, the floating arm 106 of each control unit gradually rises until it reaches the point where it causes the mercury switch 123 to make contact, thereby energizing one of the solenoids, such as the solenoid 203. (Figure 10). The latter thus energized operates its brake shoe 197 against the brake drum 193, causing the wind-up roll 207 to slow down or stop until the floating arm 106 drops downward and causes the mercury switch to break the contact and de-energize the brake solenoid 203. When the brake is thus released, the wind-up roll 207 again begins to wind up the cord, and the foregoing operation repeats itself.

The machine is additionally provided with a limit switch to stop its operation in case the cord tangles, especially in the spindles of the latexing unit. This limit switch is the mercury switch 142, whose mechanical connections have been previously described. If the cord stops winding or tangles on either side of the floating pulley 99, the floating arm 106 will either rise and push up the limit stop 143, or fall and push down the limit stop 134. In either case, the result will be the shifting of the mercury switch 142, the latter then making a contact and energizing the operating coil 218 of the magnetic line starter 219, throwing out the switch thereof and disconnecting the power current from the latexing unit motor 71 and the wind-up motor 145 (Figure 10). It will be understood that the limit switch 142, instead of disconnecting the motors 71 and 145 from their power current sources might energize two magnetic clutches which would similarly disconnect the power and accomplish the same result, without exceeding the scope of my invention.

*Modified form of latexing section of the apparatus*

The slightly modified form of latexing apparatus shown in Figures 16 to 19 inclusive is substantially similar to the form shown in Figures 3 to 6 inclusive, as will be seen by a comparison of the drawings. The spindles 223 of the modified form, however, are arranged in staggered positions, whereas the spindles 26 were arranged in substantially a straight line. The staggered arrangement enables the spindles to be equipped with larger bearings 225, thereby increasing the wearing life of the machine and reducing the frequency of repairs and replacements. The pinions 228 of the modified form are driven from one another in exactly the same manner as the pinions 28, the master spindle 229 having the master pinion 230 which meshes with the gear 231 on the roll shaft 234. The cord passes through the modified machine in the path shown in Figure 18, the operation being the same as in the form of machine previously described.

*Operation*

The operation of the mechanical and electrical parts of the machine has been previously disclosed at the time these parts were described. The cords pass from the spools 5, 6, 7 and 8 through the apertures 78 of the aperture plate 10 into the latex solution in the latex tank 15 (Figures 1 and 2), thence through the apertures 74 of the cord guide plate 72. From the latter, the cords thread their way in and out between the rollers 26, having the grooves 27 to space the cords, on their way passing between the squeeze rolls 37 and 41 and also between the squeeze rolls 50 and 54. While passing around the rollers 26, the cord is alternately flexed in opposite directions, since the direction of rotation is reversed between every roller by the arrangement of the gearing. This causes the cord to be flexed first one way and then the other, the twist thereof being thus opened up, permitting the latex solution to penetrate through the innermost fibers of the cord. The squeezing and wringing action of the squeeze rolls further facilitates the thorough soaking of the cord with the latex and aids in the penetration of the latexing solution. Since all of the rollers and the squeeze rolls are driven, and are geared so that the peripheral speeds of all are the same, the cord is carried through the solution under very little tension. This reduction in the tension necessarily retards the tendency to twist the cord tighter, such as would result if the cord were pulled through the solution under a greater tension, and causes the cord strands to open up in a more satisfactory way.

The cords emerge from the squeeze rolls 50 and 54 and then pass through the apertures 75 of the cord guide plate 73, thence upward through the apertures 83 of the aperture plate 79 above the latexing solution. The level of the latter may be adjusted by rotating the hand crank 22, and thereby moving the latexing tank up or down.

The cords then pass through the drying troughs 92 where their external surfaces are dried with air directed thereon from the drying pipes 93. The cords then pass over the guide pulleys 97, around the floating pulleys 99, over the guide pulleys 100, through the apertures 102 of the aperture plate 103, thence through the apertures 156 in the guide arm 155, and thence on to their respective spools 151 to 154 inclusive. During this travel of the cords as described above, the tension of the cord is regulated by the floating arms 106 and the mercury switches 123; and the machine is protected by the mercury limit switch 142 in case any of the cords become tangled or for any reason are not wound on their spools.

In utilizing my apparatus and process, it will be understood that it is not necessary to confine the arrangement of the spindles 23 or 223 to the straight-line or staggered positions shown: on the contrary the spindles may be arranged in a circle, semi-circle, or any other convenient path. It will also be understood that the squeeze rolls 37, 41, 50 and 54 may be omitted if desired, without departing from the scope of my invention.

The tension under which the cords operate may be varied as desired. This is accomplished by shifting the position of the counter-weight 111 on each of the floating arms 106 (Figure 8).

Figures 18, 19, 20:
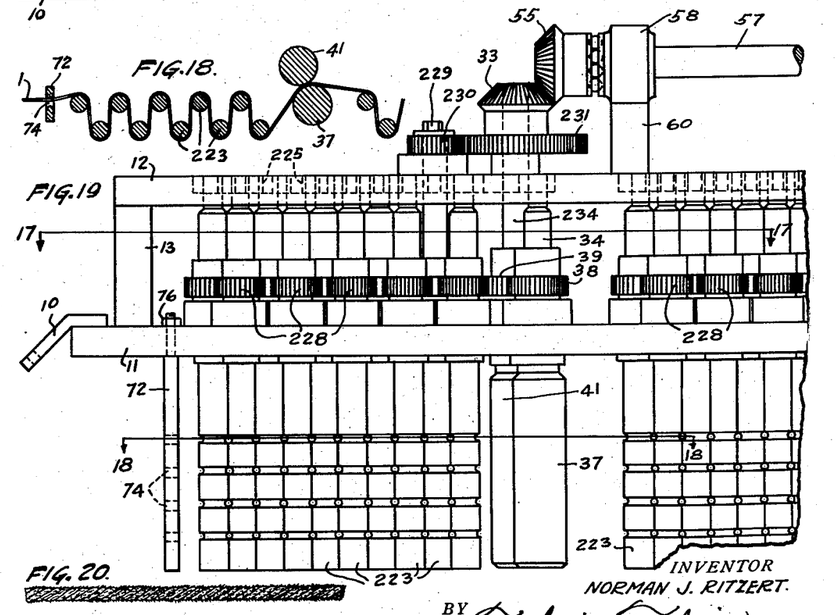
Figure 18 is a horizontal sectional view along the line 18—18 of Figure 19.
Figure 19 is a side elevation of the latex impregnating apparatus shown in Figure 16.
Figure 20 is an enlarged view of a portion of one of the cords prior to its being impregnated and/or coated with latex.
Figure 21:
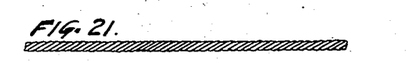
Figure 21 is a view similar to Figure 20, but showing the cord after it has been impregnated and coated with latex.

The cord before latexing has the loose fuzzy construction shown in Figure 20. After passing through the latexing, impregnating and drying process, however, the cord possesses a tightly wound and smooth appearance as shown in Figure 21. It will be understood that the drying step may be omitted, if desired, without departing from the scope of my invention.

It will be understood that I desire to comprehend within my invention such modifications as may be necessary to adapt it to varying conditions and uses.

Having thus fully described my invention, what I claim as new and desire to secure by Letters Patent is:

1. The process of impregnating a cord having a plurality of strands with a liquid which consists in causing the cord to move longitudinally through a liquid bath under continuous uniform tension, causing the cord to be progressively and alternately flexed in opposite directions in the liquid to open the strands without stopping the cord movement and without reducing the tension on the cord as a whole, and thereafter compressing the cord in the liquid.

2. The process of impregnating a cord having a plurality of strands with a liquid which consists in causing the cord to move longitudinally through a liquid bath under continuous uniform tension, causing the cord to be progressively and alternately flexed in opposite directions in the liquid to open the strands without stopping the cord movement and without reducing the tension on the cord as a whole, and causing pressure to be applied to the liquid about the inner half peripheries of the cord at its points of flexion.

3. In a process of impregnating a cord of textile material having a plurality of twisted strands to form the cord, immersing the cord in a latex solution, bending the cord in alternate directions in close succession while immersed, maintaining the cord under substantially uniform tension while so immersed, and maintaining it at a substantially uniform speed of movement continuously while immersed.

4. In a process of impregnating a cord of textile material having a plurality of twisted strands to form the cord, immersing the cord in a latex solution, bending the cord in alternate directions in close succession while immersed, maintaining the cord under substantially uniform tension while so immersed maintaining it at a substantially uniform speed of movement continuously while immersed, and squeezing the cord while immersed.

5. In a process of impregnating a cord of textile material having a plurality of twisted strands to form the cord, immersing the cord in a latex solution, bending the cord in alternate directions in close succession while immersed, maintaining the cord under substantially uniform tension while so immersed, maintaining it at a substantially uniform speed of movement continuously while immersed, and squeezing the cord while immersed between intervals of a series of reverse bends of the cord.

6. In a process of impregnating a cord of textile material, conveying the cord through a latex bath, and flexing the cord in opposite directions in close succession to open the fibers of the cord to impregnate the cord with latex first in one direction and then in the other for uniform impregnation while maintaining the speed, tension and length substantially constant.

7. In a process of impregnating a cord of textile material, conveying the cord through a latex bath, flexing the cord in opposite directions in close succession to open the fibers of the cord to impregnate the cord with latex first in one direction and then in the other for uniform impregnation while maintaining the speed, tension and length substantially constant, and squeezing the cord while immersed to press the latex into the fibers of the cord.

NORMAN J. RITZERT.